(12) United States Patent
Kawaguchi et al.

(10) Patent No.: US 7,688,782 B2
(45) Date of Patent: Mar. 30, 2010

(54) METHOD AND SYSTEM FOR MANAGING MULTI-CHANNEL COMMUNICATION

(75) Inventors: Dean Kawaguchi, San Jose, CA (US); Vinh-Phuong Tra Le, Fremont, CA (US)

(73) Assignee: Symbol Technologies, Inc., Holtsville, NY (US)

(*) Notice: Subject to any disclaimer, the term of this patent is extended or adjusted under 35 U.S.C. 154(b) by 742 days.

(21) Appl. No.: 11/267,696

(22) Filed: Nov. 3, 2005

(65) Prior Publication Data

US 2007/0097912 A1 May 3, 2007

(51) Int. Cl.
*H04W 4/00* (2009.01)
(52) U.S. Cl. .................................. 370/329; 370/338
(58) Field of Classification Search .............. 370/431, 370/329, 338, 225, 228, 332, 242, 245, 252, 370/401
See application file for complete search history.

(56) References Cited

U.S. PATENT DOCUMENTS

| | | | |
|---|---|---|---|
| 2004/0090929 A1* | 5/2004 | Laux et al. | 370/311 |
| 2005/0124335 A1 | 6/2005 | Cave et al. | |
| 2006/0009231 A1* | 1/2006 | Emami et al. | 455/452.2 |
| 2007/0038743 A1* | 2/2007 | Hellhake et al. | 709/224 |

FOREIGN PATENT DOCUMENTS

| | | |
|---|---|---|
| EP | 1 176 709 | 1/2002 |
| WO | 96/31075 | 10/1996 |
| WO | 2004/070988 | 8/2004 |

OTHER PUBLICATIONS

International Search Report and Written Opinion dated Jun. 6, 2007 in related application PCT/US2006/043023.
Publication of International Application WO2007/056180 dated May 18, 2007 in related application PCT/US2006/043023.
Republication of International Application WO2007/056180 dated Jul. 26, 2007 in related application PCT/ US2006/043023.
International Preliminary Report on Patentability dated May 18, 2008 in related application PCT/US2006/043023.

* cited by examiner

*Primary Examiner*—Brian D Nguyen

(57) ABSTRACT

Described is a system and method for managing multi-channel communication. The system includes a plurality of wireless devices communicating by utilizing at least one wireless communications channels. A network management arrangement controls allocation of the wireless communications channels and divides the wireless channels into a first channel pool and a second channel pool. The second pool including at least one channel. The arrangement utilizes the second pool only upon detection of a predetermined condition.

27 Claims, 3 Drawing Sheets

METHOD AND SYSTEM FOR MANAGING MULTI-CHANNEL COMMUNICATION

BACKGROUND INFORMATION

In a conventional wireless network, wireless communication between a transmitter and a receiver typically occurs over a single frequency channel. A throughput of the system is limited because the communication is half-duplexed in that only one of the transmitter and the receiver utilizes the channel at a single time. Thus, each has to wait for the other to cease utilizing the channel. In addition, an interruption or an interference of the communication on the channel causes a delay and prevents efficient data exchange.

A conventional method for increasing the throughput of the network includes use of a multiple-channel transceiver. For example, according to an IEEE 802.11g wireless standard, up to three non-overlapping channels may be used for simultaneous communications. However, this method fails to address the interruption and the interference, which occurs in the single frequency channel network. That is, the interruption and interference now occur simultaneously on three channels. Accordingly, there exists a need for a method which protects the wireless communication against interruption, interference, and delay while maintaining the throughput.

SUMMARY OF THE INVENTION

The present invention relates to a system and method for managing multi-channel communication. The system includes a plurality of wireless devices communicating by utilizing at least one wireless communications channels. A network management arrangement controls allocation of the wireless communications channels and divides the wireless channels into a first channel pool and a second channel pool. The second pool including at least one channel. The arrangement utilizes the second pool only upon detection of a predetermined condition.

DETAILED DESCRIPTION

Figure 1:
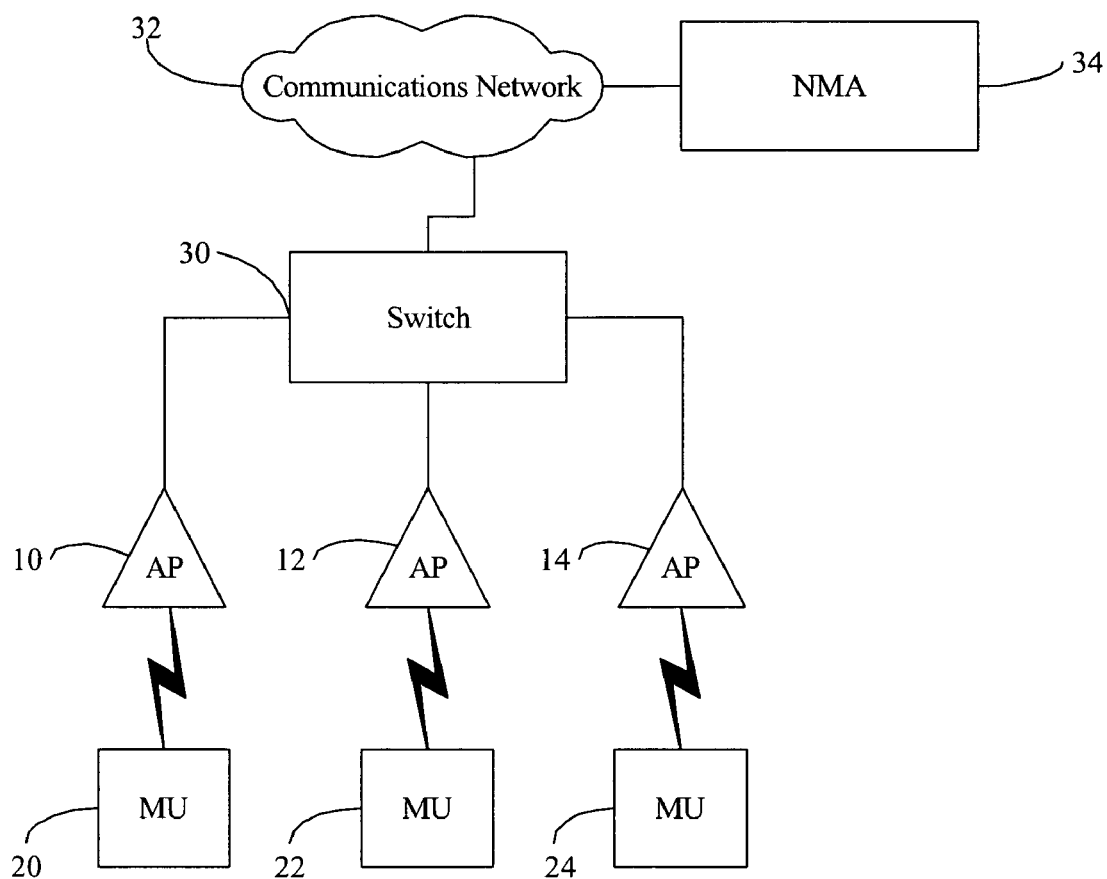
FIG. 1 is an exemplary embodiment of a system for multi-channel communication according to the present invention.

The present invention may be further understood with reference to the following description and the appended drawings, wherein like elements are provided with the same reference numerals. The present invention provides a system and a method for multi-channel communication in a wireless environment such as a wireless local area network ("WLAN").

FIG. 1 shows an exemplary embodiment of a system 1 for multi-channel communication according to the present invention. The system 1 may include a network communications arrangement ("NMA") 34 connected to a communications network 32. The network 32 may allow one or more devices connected thereto to access the NMA 34 and vice-versa. The system 1 may further include a switch 30, coupled to one or more access points ("APs") 10-14 which are in wireless communication with one or more mobile units ("MUs") 20-24. The APs 10-14 may provide wireless connections for the MUs 20-24 to the network 32 via the switch 30. Those of skill in the art will understand that the system 1 may include any number of APs and MUs.

Each of the APs 10-14 may be any wireless infrastructure device (e.g., a wireless hub, a router, a switch, etc.) which provides access to the network 32 for the MUs 20-24. For example, the AP 10 may provide access to the MU 20, the AP 12 may provide access to the MU 22, and the AP 14 may provide access to the MU 24. In addition, each of the MUs 20-24 may access more than one AP, but may only be in communication with one AP at a time. Each AP 10-14 may include a radio frequency ("RF") transceiver allowing the AP to communicate with the MUs 20-24 according to a wireless communications protocol (e.g., IEEE 802.11a-g protocols, etc.) utilized therein. The transceiver may be a multi-channel transceiver allowing the AP to communicate with a plurality of MUs simultaneously in addition to communicating with one MU at a time. Each AP 10-14 may further include additional circuitry such as a memory arrangement for storing the wireless communications protocol, a processor for controlling a communication, and an attachment arrangement for connecting to the switch 30.

The MUs 20-24 may be any mobile computing device (e.g., including a laptop, cell phone, an image/laser-based scanner, an RFID reader, wireless modem, etc.) that includes an RF communications arrangement (e.g., a transmitter and/or a receiver) allowing it to communicate with the APs 10-14 according to the wireless communications protocol. In this manner, the MUs 20-24 may transmit/receive RF signals to/from the APs 10-14, thereby allowing the MUs 20-24 to communicate with NMA 34 and other devices that may be connected to the network 32.

The network 32 may be any communications network comprising one or more infrastructure components which interconnect computing devices (e.g., hubs, switches, servers, etc.). The network 32 is connected to the NMA 34, which may be a computing arrangement including a memory (e.g., RAM, non-volatile, etc.), a data storage arrangement (e.g., hard drives, optical drives, etc.), a processor(s), and any other internal circuitry necessary for the NMA 34 to perform its functions.

The NMA 34 may include one or more components (e.g., a server, a database, a router, etc.) for managing the network 32, the switch 30, the APs 10-14, and the MUs 20-24. In other embodiments, the NMA 34 may manage a plurality of wireless and/or wired networks. The NMA 34 may store data about the APs 10-14 and the MUs 20-24. The data may include an operational status of the APs 10-14 and/or the MUs 20-24, MAC addresses, etc. The data may further include resource information. For example, the resource information may be a list of communications channels (e.g., frequency channels) which the APs 10-14 may utilize for communication with the MUs 20-24. The resource information may further comprise a channel pool from which the NMA 34 may allocate one or more channels to one or more APs. Examples of channel pools and channel allocation will be discussed in detail below.

According to the present invention, the NMA 34 may monitor the communications between the APs 10-14 and the MUs 20-24. For example, when the MU 20 initially connects to the AP 10 for a first time by transmitting a request to establish communications, the NMA 34 may accept or deny the request. If the request is accepted, the NMA 34 may allocate the frequency channel from the channel pool to the AP 10 for communications with the MU 20. Thereafter, the NMA 34 monitors the communications and allows the AP 10 to utilize the frequency channel while a set of predetermined standard conditions exists. For example, the standard conditions may include data transmission rates, latency, loading, priority, and other criteria. When the standard conditions are not met (e.g., a contingency condition is reached), the NMA 34 may allocate one or more further frequency channels from the channel pool to the AP 10 for communications with the MU 20. The contingency condition may be a data overflow, an interference, a higher priority request, etc. Thus, communications between the MU 20 and the AP 10 may continue substantially uninterrupted. Details of the frequency channel allocation process will be further described below.

Figure 2:
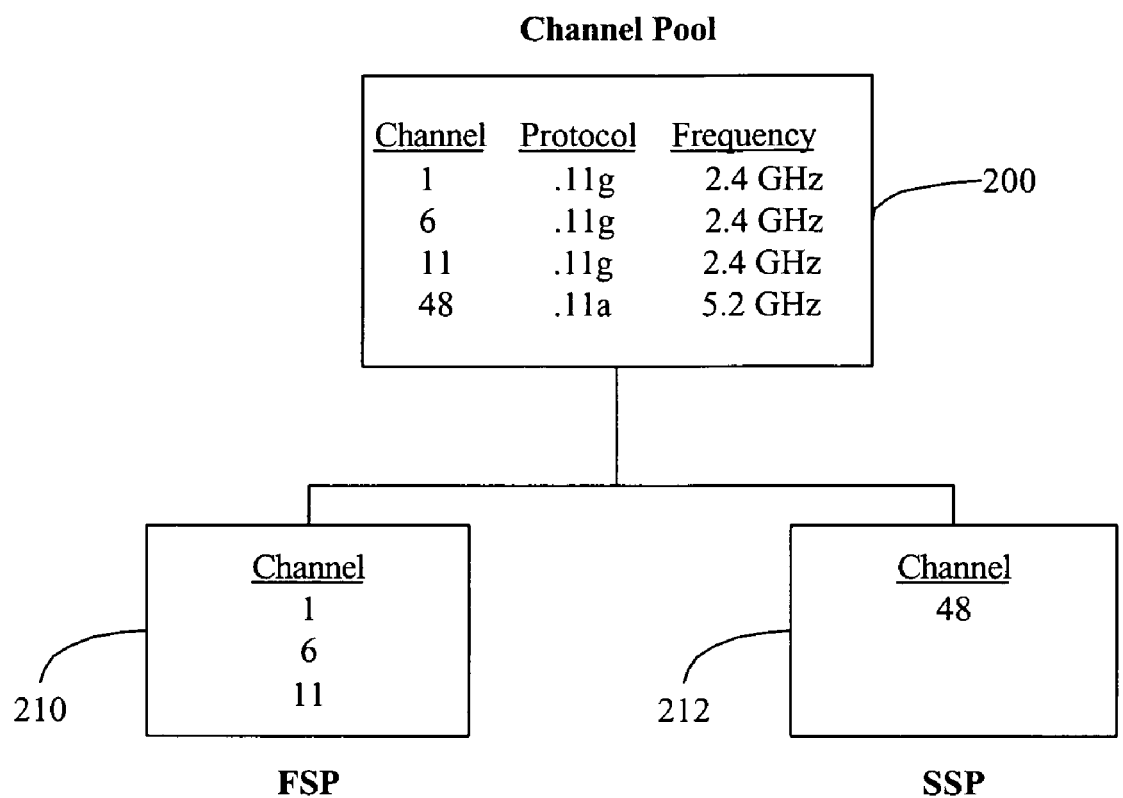
FIG. 2 is an exemplary embodiment of a channel pool according to the present invention.

FIG. 2 shows an exemplary embodiment of a channel pool 200 according to the present invention. The channel pool 200 may be assigned to a single AP (e.g., the AP 12), and may include a list of frequency channels which may be utilized thereby. In one embodiment, the frequency channels are located within a plurality of frequency bands (i.e., multi-banded). In another embodiment, the frequency channels may be located within a single frequency band (i.e., single-banded). The frequency channels may be assigned to one or more wireless protocols (e.g., 802.1x protocols). As shown in FIG. 2, the channel pool 200 includes the frequency channels which utilize the 802.11a and 802.11g protocols. As known to those skilled in the art, the 802.11a protocol utilizes a single frequency channel located within a frequency band of 5.2 GHz, while the 802.11g protocol may use up to three frequency channels at a time, each of which are located within a frequency band of 2.4 GHz. Thus, the channel pool 200 may include a total of four frequency channels. Those skilled in the art will also understand that the maximum number of frequency channels available for a given protocol may vary according to various national regulations. Thus, the embodiment shown in FIG. 2 should be considered exemplary rather than limiting. In an embodiment utilizing 802.11a, b, g the total of non-overlapping channels in the U.S. would be 15 (12+3), and 21 (18+3) in Europe.

The channel pool 200 may be divided into a first sub-pool ("FSP") 210 and a second sub-pool ("SSP") 212. The FSP 210 may be a list of normal frequency channels for use during the standard conditions, while the SSP 212 may be a list of reserve frequency channels which are used during the contingency conditions.

Figure 3:
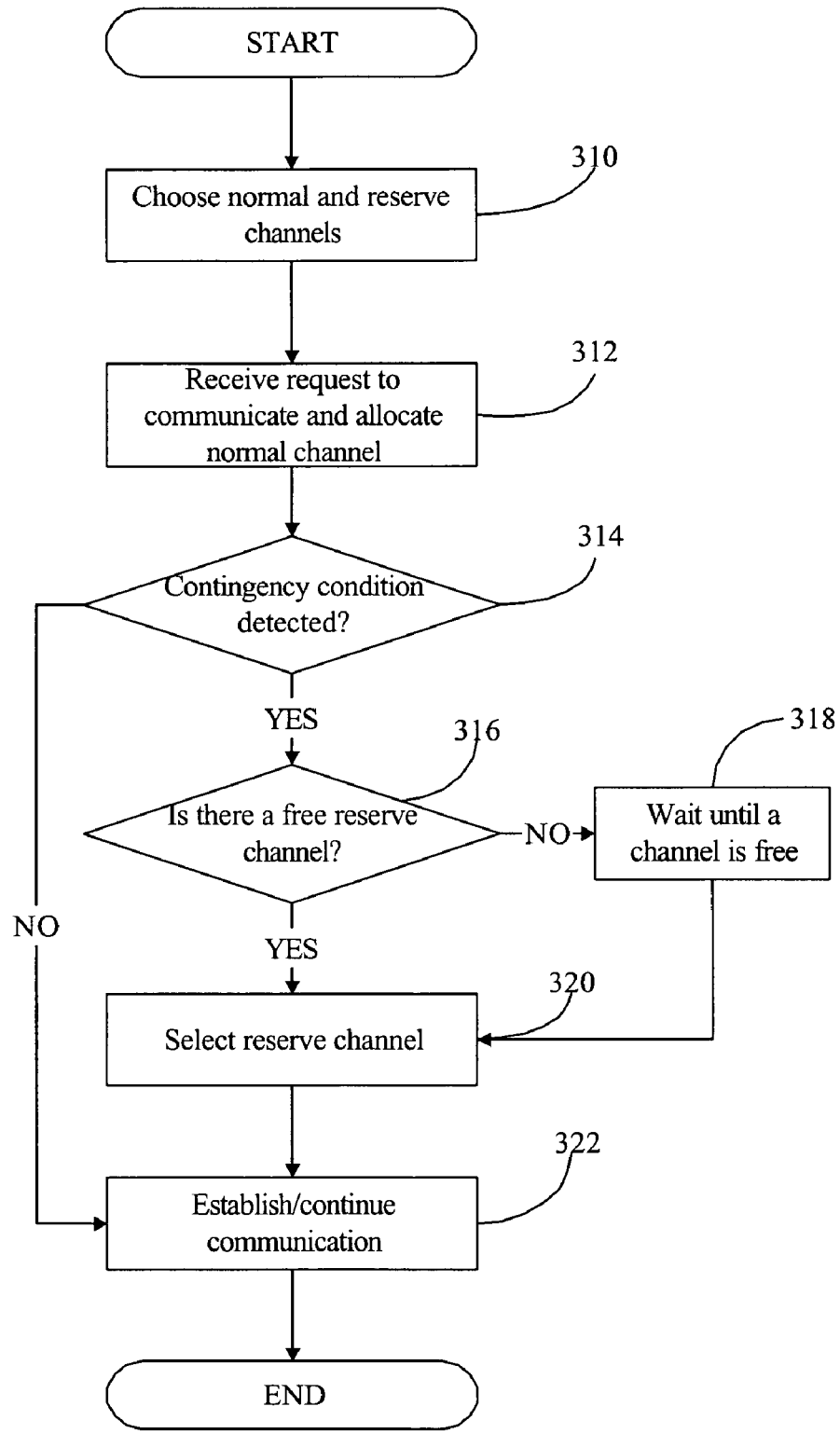
FIG. 3 is an exemplary embodiment of a method for multi-channel communication according to the present invention.

FIG. 3 shows an exemplary embodiment of a method 300 for multi-channel communication according to the present invention. The method 300 will be described with reference to the channel pool 200 of FIG. 2 and the system of FIG. 1. However, those skilled in the art will understand that the method 300 may be applied to any channel pool for any AP in the system 1. In step 310, the NMA 34 selects the normal and reserve channels by dividing the channel pool 200 into the FSP 210 and the SSP 212. In particular, the channel pool 200 is divided in such a manner so that there is at least one reserve channel. As shown in FIG. 2, the FSP 210 includes three normal channels, and the SSP 212 includes one reserve channel. In other exemplary embodiments, the number of normal and reserve channels may vary depending on the particular wireless protocol(s) selected. Thus, if the channel pool 200 contains a total number of frequency channels N, the FSP 210 may include up to N−1 normal channels and the SSP 212 includes at least 1 reserve channel.

In step 312, the NMA 34 receives a request to communicate with the AP 12 from the MU 22 and accepts the request by allocating one of the normal channels from the FSP 210. When a channel is allocated for use by the NMA 14 from either the FSP 210 or the SSP 212, the channel is preferably chosen to minimize interference between a device to which the channel is allocated (e.g., the AP 12) and any neighboring or adjacent devices (e.g., the APs 10 and 14) with which the device may interfere. For example, if the neighboring device is using a first channel in a first frequency band (e.g. 2.4 GHz), the NMA 14 may select a second channel in a second frequency band (e.g., 5.2 GHz). If the second frequency band is not available (e.g., single-banded or all channels in the second frequency band are already allocated), the NMA 14 may select the second channel from within the first frequency band so that the second channel is located far from the first channel within the first frequency band.

In step 314, the NMA 312 determines whether the contingency condition has been detected. If the contingency condition is not detected, the AP 12 and the MU 22 may continue communicating on the normal channel, as seen in step 322.

In step 316, the contingency condition has been detected (so the NMA 34 determines whether a reserve channel may be utilized). For example, the data transmission rate may have dropped below a critical level or a response time of the AP 12 may be longer than allowable by the standard conditions. In response to the detection of the problem, the NMA 34 attempts to allocate a reserved channel to the AP 12. In one embodiment, the NMA 34 may first check the FSP 210 and attempt to allocate any free normal channels located therein before attempting to allocate the reserve channel.

In step 318, no reserve channels are available (e.g., because of another contingency condition. Thus, the NMA 34 may have to wait until one of the reserve channels becomes free. During this period, the NMA 34 may continue to monitor the communications between the AP 12 and the MU 22. If the communications return to the standard conditions (i.e., the contingency condition is mitigated or resolved), the NMA 34 may abandon the attempt to allocate the reserve channel. However, if the communications do not return to the standard conditions, the NMA 34 may continue to wait until the reserve channel is free or it may abandon the attempt after a predetermined amount of time has passed. In either instance, the NMA 34 may attempt to signal to the MU 22 that a critical failure has happened and/or attempt to switch the MU 22 from communicating with the AP 12 to communicating with another AP to which the MU 22 has access.

In step 320, the reserve channel is available and selected by the NMA 34. The reserve channel is allocated to the AP 12.

In step 322, the AP 12 utilizes the reserve channel to establish/continue communications with the MU 22. If either the AP 12 or the MU 22 was engaged in a transmission which was interrupted/interfered with when the problem occurred, the transmission may then be re-attempted or resumed using the reserve channel.

In one embodiment, the frequency allocation was performed by the NMA 34. However, the allocation process and other steps of the method 300 may be performed by any network device which has resource management capabilities. For example, the switch 30 may perform the allocation process.

In other embodiments, the APs 10-14 may be responsible for managing the allocation of the frequency channels. For example the APs 10-14 may communicate status and resource information between each other and negotiate the allocation of the frequency channels. When an AP (e.g. AP 10) requires an additional frequency channel, the AP may poll each remaining AP (e.g., APs 12-14) to determine which frequency channels are available.

According to the present invention, the sub-channel pools may be rebalanced as a function of one or more predetermined parameters (e.g., traffic, a number of connections supported, etc.). For example, if the FSP 210 includes three channels and the SSP 212 includes only a single channel, one of the channels in the FSP 210 may be reassigned to the SSP 212. Those of skill in the art will understand that a plurality of sub-channel pools may be balanced in this manner, and the channels reassigned as a function of any of the predetermined parameters.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A system, comprising:
    a communication network comprising a wireless infrastructure device;
    a plurality of mobile wireless devices operatively coupled to the network, the plurality of mobile wireless devices configured to communicate via the infrastructure device using a plurality of wireless communications channels; and
    a network management arrangement controlling allocation of the plurality of wireless communications channels, the arrangement configured to divide the wireless channels into a first channel pool identifying at least one frequency channel to be provided for communication between the infrastructure device and one of the plurality of mobile devices under a first operational condition, and a second channel pool identifying at least one reserve channel to be provided for communication between the infrastructure device and the one of the plurality of mobile devices under a second operational condition, the first operational condition different from the second operational condition, wherein the plurality of wireless communication channels are rebalanced between the first and second channel pools as a function of one or more predetermined network parameter.

2. The system according to claim 1, wherein the infrastructure device includes at least one of an access point, an access port and a switch.

3. The system according to claim 1, wherein the first channel pool includes at least one further channel and the arrangement assigns the at least one further channel from the first channel pool to the infrastructure device.

4. The system according to claim 3, wherein the second operational condition includes at least one of a data overflow, an interference, a decrease in a data transmission rate and an increase in a response time at a particular wireless device.

5. The system according to claim 4, wherein, upon detection of the second operational condition, the arrangement assigns the at least one channel from the second channel pool to the particular wireless device.

6. The system according to claim 3, wherein the second operational condition is a priority request.

7. The system according to claim 1, wherein the at least one frequency channel is located within at least one frequency bands.

8. The system according to claim 1, wherein the at least one frequency channel is assigned to at least one wireless communication protocol.

9. The system according to claim 8, wherein the at least one protocols are at least one of IEEE 802.11a, 802.11b, 802.11g, 802.11n and 802.16.

10. The system according to claim 1, wherein the arrangement includes a switch.

11. The system of claim 1, wherein the predetermined network parameter is selected from the group consisting essentially of number of connections supported and network traffic.

12. A method, comprising:
    dividing a plurality of wireless channels utilized for wireless communication by wireless devices into a first and second channel pool using a network management arrangement connected to a network;
    identifying at least one frequency channel to be provided for communication between a network infrastructure device and one of a plurality of mobile devices under a first operational condition from the first channel pool using the network management arrangement;
    identifying at least one reserve channel to be provided for communication between the network infrastructure device and the one of the plurality of mobile devices under a second operational condition from the second channel pool using the network management arrangement, the first operational condition different from the second operational condition; and
    controlling allocation of the plurality of wireless communications channels in response to the first or second operational condition, wherein the plurality of wireless communication channels are rebalanced between the first and second channel pools as a function of one or more predetermined network parameter.

13. The method according to claim 12, wherein each of the wireless devices includes at least one of an access point, an access port and a switch.

14. The method according to claim 12, wherein the first channel pool includes at least one further channel.

15. The method according to claim 14, further comprising: assigning the at least one further channel from the first channel pool to a particular wireless device.

16. The method according to claim 15, wherein the second operational condition includes at least one of a data overflow, an interference, a decrease in a data transmission rate and an increase in a response time at the particular wireless device.

17. The method according to claim 16, wherein, upon detection of the second operational condition, assigning the channel from the second channel pool to the particular wireless device by the arrangement.

18. The method according to claim 15, wherein the second operational condition is a priority request.

19. The method according to claim 12, wherein the at least one frequency channel is located within at least one frequency bands.

20. The method according to claim 12, wherein the at least one frequency channel is assigned to at least one wireless communication protocol.

21. The method according to claim 20, wherein the at least one protocols are at least one of IEEE 802.11a, 802.11b, 802.11g, 802.11n and 802.16.

22. The method according to claim 12, wherein the method is executed by a switch.

23. An arrangement, comprising:
    a processor controlling allocation of wireless communication channels utilized by a plurality of wireless devices; and
    a communications arrangement communicating with at least one of the wireless devices, wherein, the processor divides the wireless channels into a first channel pool identifying at least one frequency channel to be provided for communication between an infrastructure device and one of the plurality of mobile devices under a first operational condition, and a second channel pool identifying at least one reserve channel to be provided for communication between the infrastructure device and the one of the plurality of mobile devices under a second operational condition, the first operational condition different from the second operational condition, wherein the wireless communication channels are rebalanced between the first and second channel pools as a function of one or more predetermined network parameter.

24. The arrangement according to claim 23, wherein the first channel pool includes at least one further channel, and the processor assigns the at least one further channel from the first channel pool to a particular wireless device.

25. The arrangement according to claim 24, wherein the second operational condition includes at least one of a data overflow, an interference, a decrease in a data transmission rate and an increase in a response time at the particular wireless device.

26. The arrangement according to claim 25, wherein, upon detection of the second operational condition, the processor assigns the channel from the second channel pool to the particular wireless device.

27. The arrangement according to claim 24, wherein the second operational condition is a priority request.

* * * * *

UNITED STATES PATENT AND TRADEMARK OFFICE
CERTIFICATE OF CORRECTION

PATENT NO. : 7,688,782 B2  
APPLICATION NO. : 11/267696  
DATED : March 30, 2010  
INVENTOR(S) : Kawaguchi et al.

Page 1 of 1

It is certified that error appears in the above-identified patent and that said Letters Patent is hereby corrected as shown below:

In Column 3, Line 64, delete "NMA 14" and insert -- NMA 34 --, therefor.

In Column 4, Line 4, delete "NMA 14" and insert -- NMA 34 --, therefor.

In Column 4, Line 7, delete "NMA 14" and insert -- NMA 34 --, therefor.

In Column 4, Line 11, delete "NMA 312" and insert -- NMA 34 --, therefor.

Signed and Sealed this
Second Day of October, 2012

David J. Kappos
*Director of the United States Patent and Trademark Office*